Figure 1:
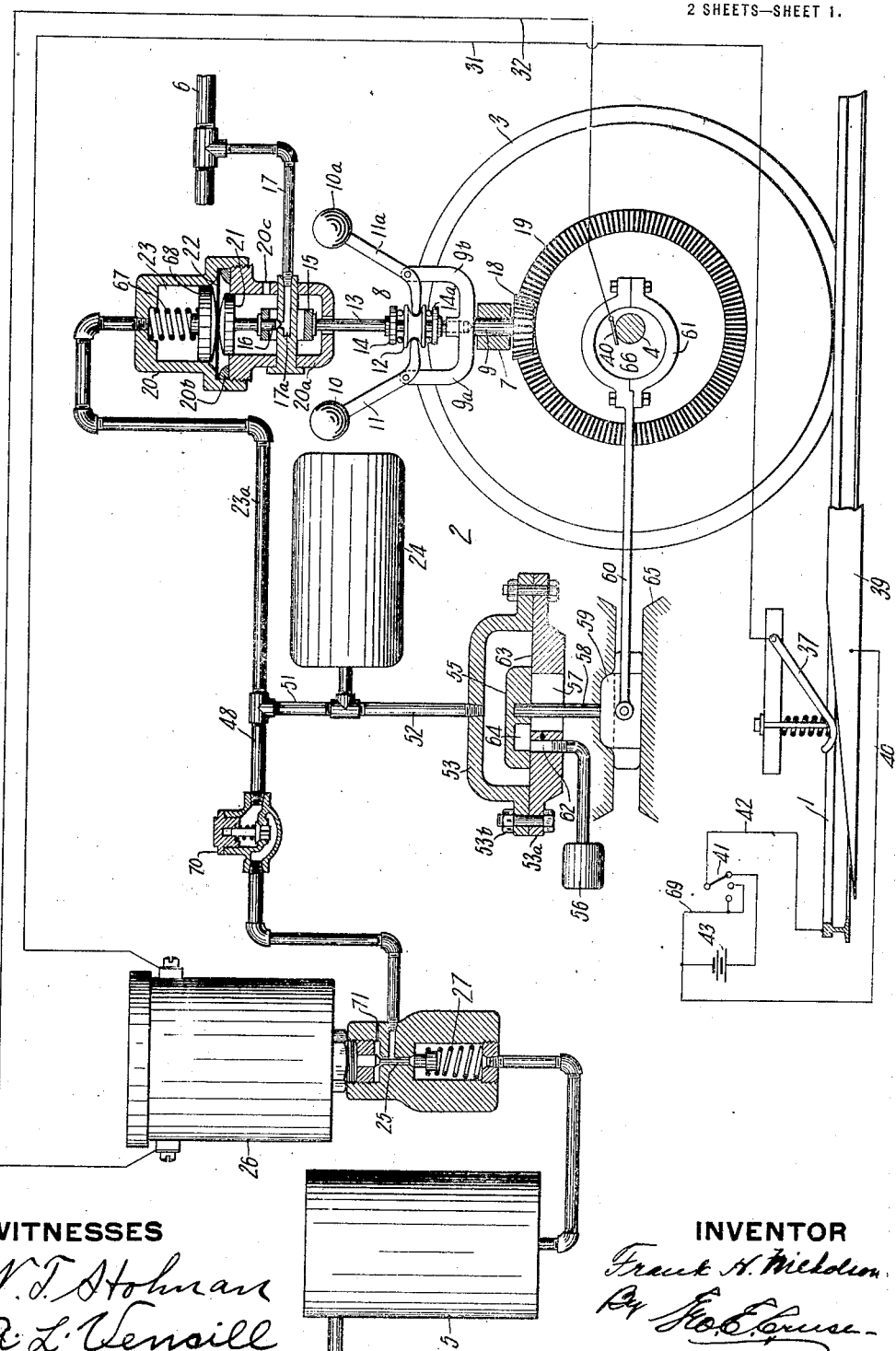

F. H. NICHOLSON.
APPARATUS FOR CONTROLLING THE PASSAGE OF CARS OR VEHICLES ALONG RAILWAYS.
APPLICATION FILED MAR. 19, 1913.

1,317,308.

Patented Sept. 30, 1919.
2 SHEETS—SHEET 1.

WITNESSES

INVENTOR

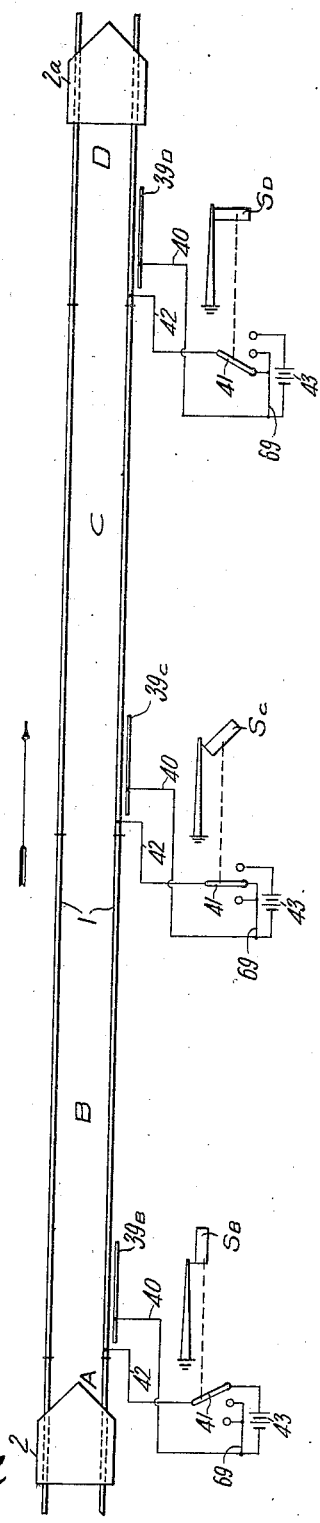

UNITED STATES PATENT OFFICE.

FRANK H. NICHOLSON, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

APPARATUS FOR CONTROLLING THE PASSAGE OF CARS OR VEHICLES ALONG RAILWAYS.

1,317,308.   Specification of Letters Patent.   Patented Sept. 30, 1919.

Application filed March 19, 1913. Serial No. 755,528.

*To all whom it may concern:*

Be it known that I, FRANK H. NICHOLSON, a citizen of the United States, residing at Wilkinsburg, in the county of Allegheny and State of Pennsylvania, have invented certain new and useful Improvements in Apparatus for Controlling the Passage of Cars or Vehicles Along Railways, of which the following is a specification.

My invention relates to apparatus for controlling the passage of cars or trains along a railway.

I will describe one form of apparatus embodying my invention and will then point out the novel features thereof in claims.

In the accompanying drawings, Figure 1 is a view, partly diagrammatic, showing a portion of a railway vehicle having applied thereto one form of apparatus embodying my invention. Fig. 2 is a diagrammatic view showing a portion of a railway having applied thereto certain apparatus shown in Fig. 1.

Similar reference characters refer to similar parts in each of the views.

Referring particularly to Fig. 1, the reference character 1 designates a track rail of a railway track upon which a vehicle 2 is adapted to travel. This vehicle may, for example, be a car, a steam locomotive, or an electric locomotive; for purposes of simplifying the drawing, the only part of the vehicle proper which I have here shown is a wheel 3. The vehicle 2 is provided with a fluid pressure braking apparatus comprising a brake pipe 6. It is understood that a reduction of pressure in this brake pipe causes an application of the brakes. 5 is a reservoir to which fluid pressure is supplied by any suitable means; it is understood that the pressure in this reservoir is of a constant value.

Mounted on the vehicle is a centrifugal device 8 which is operated by a wheel of the vehicle. This centrifugal device, as here shown, comprises a shaft 9 mounted in a suitable bearing 7 and having two arms $9^a$ and $9^b$. Fixed to the shaft 9 is a bevel gear which meshes with a bevel gear 19 fixed to the wheel 3, so that the shaft 9 is constantly rotated while the vehicle is in motion. Pivoted in the ends of arms $9^a$ and $9^b$, respectively, are two bell-cranks 11 and $11^a$; the outer ends of which carry weights 10 and $10^a$, respectively. The inner ends of the cranks 11 and $11^a$ fit into a groove in a collar 12 which latter is supported on ball-bearings 14, $14^a$, carried by a rod 13. This rod 13 is mounted to reciprocate longitudinally. The lower end of this rod bears in a suitable hole in the upper end of shaft 9, and the upper portion of rod 13 is journaled in member $20^a$ of a structure hereinafter described. Rod 13 carries at its upper end a yoke 15 through the opening of which passes the end $17^a$ of a pipe 17, which latter is, as here shown, connected with the brake pipe 6. It is understood, however, that the pipe 17 may be employed to control the pressure in brake pipe 6 by any suitable means. The pipe end $17^a$ is provided with an opening in the form of a valve seat, which is at times closed by a valve 16 fixed in the yoke 15. It will be seen that when the rod 13 occupies the lowest position of its stroke, which is the position in which it is shown in the drawing, the valve 16 is seated, and pipe 17 is, therefore, closed, but that when the rod 13 is raised by the collar 12 due to the outward movement of the balls 10, $10^a$, the valve 16 is unseated and the brake pipe 6 is thereby opened to atmosphere through an exhaust port $20^c$.

This upward movement of rod 13 to unseat valve 16 is resisted by means which I will now explain. Fixed to the yoke 15 is a head 21 which is adapted to bear against one face of a movable member 22, here shown as being a diaphragm. This diaphragm is suitably mounted in two members 20 and $20^a$ of a box-like structure which incloses certain parts of the apparatus. These two members are screwed together, thereby clamping the diaphragm 22 between the member 20 and a gasket $20^b$. The other face of diaphragm 22 is exposed to the fluid pressure in a chamber 23, which chamber is connected with a reservoir 24 by means of a pipe $23^a$.

Fluid pressure is admitted to the reservoir 24 from main reservoir 5 through a pipe 48 by means of a pin-valve 25, which valve is controlled by an electromagnet 26 in a usual and wellknown manner. The pin-valve 25 is biased by a spring 27 to such position that it disconnects the reservoir 24 from reservoir 5, but when the electromagnet 26 is energized, the valve is moved against the action of spring 27 to such position as to connect reservoirs 24 and 5. The electromagnet 26 is normally deënergized but may be energized at intervals from sources of current exterior to the vehicle by means of the contact of a shoe 37 on the vehicle with ramp rails 39 located at intervals along the trackway.

With the form of pin valve 25 here shown, when pipe 48 is disconnected from reservoir 5, the former is open to atmosphere through a port 71. To prevent the outflow of fluid from reservoir 24 at this time, I insert in pipe 48 a check valve 70, of a usual and wellknown type, which permits flow of fluid from reservoir 5 to reservoir 24 but prevents flow of fluid from reservoir 24 to atmosphere through port 71.

The circuit for electromagnet 26 is from a battery 43 located alongside the trackway, through wire 40, ramp rail 39, shoe 37, wire 31, magnet 26, wire 32, brush 40, wheel 3, rail 1, wire 42, contact 41, to battery 43. It will be seen, therefore, that as shoe 37 makes contact with ramp rail 39, if contact 41 is in such position that battery 43 is not connected with both the ramp rail and the track rail, electromagnet 26 will not be energized, but if contact 41 is in such position that battery 43 is connected with both the ramp rail and the track rail, electromagnet 26 will be energized and reservoir 24 will be charged with fluid pressure from reservoir 5.

As here shown, when contact 41 is in such position that battery 43 is not connected with the track rail, the track rail and the ramp rail are connected by wires 40, 69 and 42 and contact 41, so that then when the shoe 37 engages the ramp rail 39, the magnet 26 on the vehicle is placed on a short circuit of low resistance; by this arrangement I avoid danger of false operation of electromagnet 26 by foreign current.

The fluid pressure in reservoir 24 is permitted to flow out to atmosphere in accordance with the distance traveled by the vehicle. The means which I have here shown for thus governing the outflow, comprises a slide valve 55 which is operatively connected with an eccentric 66 on a shaft 4, which is fixed on the outer face of wheel 3. The slide valve 55 reciprocates on a valve face 63 provided on one member 53$^a$ of a valve box. The other member 53 of the valve box is secured to member 53$^a$ by bolts 53$^b$. Extending from the valve face 63 are two ports 57 and 62; port 57 opens to atmosphere, and port 62 connects with a reservoir 56. The slide valve 55 is provided with a recess 64 adapted to connect ports 57 and 62 when the slide valve is in certain positions of its stroke. The interior of the valve box 53 is connected with reservoir 24 by a pipe 52. The slide valve 55 is reciprocated by a rod 58 suitably fixed in the valve, which rod is also fixed in a crosshead 59 adapted to reciprocate on a surface 65. This crosshead is connected by means of a rod 60 with an eccentric strap 61 which surrounds eccentric 66.

The operation of the means which I have just described for permitting the outflow of fluid from reservoir 24, is as follows:

When the slide valve 55 is in the position shown, that is, at the left hand end of its stroke, the recess 64 connects ports 62 and 57, so that reservoir 56 is open to atmosphere. As the slide valve moves toward the right, the recess 64 leaves port 62, thereby disconnecting reservoir 56 from atmosphere. After further movement of the slide valve to the right, the valve uncovers port 62 so that fluid from reservoir 24 flows into reservoir 56. The slide valve does not move far enough to the right to uncover port 57. When now slide valve 55 returns toward the left, it first covers port 62, and later the recess 64 again connects ports 62 and 57, thereby permitting the fluid in reservoir 56 to flow out to atmosphere. It will thus be seen that for each revolution of the wheel 3, a certain quantity of fluid, that is, the quantity which fills reservoir 56, is permitted to flow from reservoir 24 to atmosphere. It will be evident, therefore, that the fluid pressure in reservoir 24 decreases in accordance with the distance traveled by the vehicle.

In Fig. 2 I have shown a portion of a railway, the track rails 1, 1 of which are divided into block sections A, B, C, D, etc., through which traffic moves in the direction indicated by the arrow. Block sections B, C and D are protected by signals S$^B$, S$^C$, and S$^D$, which signals may be controlled in any desired manner; the control of these signals forms no part of my invention, hence for the sake of simplicity I have shown no means for control in the drawing. As here shown, each of these signals is adapted to give three indications, viz., "stop", "caution", and "clear".

Located adjacent the entrance end of each block section is a ramp rail 39$^B$, 39$^C$, etc., each of which is similar to ramp rail 39 shown in Fig. 1. Each ramp rail is provided with a portion of a circuit in the trackway as in Fig. 1; as shown in Fig. 2 the contact 41 for each ramp rail is controlled by the signal for the corresponding block section, the control being such that this contact connects the ramp rail and the track rail by conductors of low resistance when the signal indicates either stop or caution, and connects battery 43 with both the ramp rail and the track rail when the signal indicates clear.

I will now explain the operation of the entire apparatus referring to both views.

In Fig. 2, block section D is occupied by a vehicle $2^a$ and block section A by a vehicle 2. It is understood that at least vehicle 2 is equipped with apparatus similar to that shown in Fig. 1. I will assume that vehicle $2^a$ is at rest and that vehicle 2 is moving in the direction of the arrow. Inasmuch as block section D is occupied, signal $S^D$ indicates stop, and since block sections C and B are unoccupied, signal $S^C$ indicates caution, and signal $S^B$ indicates clear.

As vehicle 2 enters block section B, the shoe 37 of this vehicle engages ramp rail $39^B$. Contact 41 operated by signal $S^B$ is in such position that this ramp rail is energized, hence electromagnet 26 on this vehicle will be energized, thereby admitting fluid from reservoir 5 to reservoir 24. As the vehicle 2 proceeds through block section B, slide valve 55 permits the fluid in reservoir 24 to flow out gradually in accordance with the distance traveled, thereby gradually reducing the pressure in this reservoir. The quantity of fluid contained in reservoir 24 when the latter has just been charged by reservoir 5 is such that in spite of the gradual reduction of this pressure, when the vehicle reaches the exit end of block section B the pressure will still be at such value that its action on diaphragm 22 will not be overbalanced by the action of centrifugal device 8 at full speed of the vehicle, such for example, as at 70 miles per hour. Hence, the vehicle 2 may proceed at full speed through block section B.

As the vehicle 2 enters block section C, the shoe 37 engages ramp rail $39^C$, but since signal $S^C$ indicates caution the contact 41 operated by the signal is in such position that this ramp rail is not energized; hence, electromagnet 26 is not energized as the vehicle passes over this ramp rail, and the supply of fluid presssure in reservoir 24 is, therefore, not renewed. The size of reservoir 24 may be such that the quantity of fluid which this reservoir contains just after being charged at ramp rail $39^B$ is such that shortly after the vehicle enters the block section C, if it still travels at full speed the action of the fluid pressure on diaphragm 22 will be overbalanced by the action of the centrifugal device 8; the valve 16 will then be unseated, causing an application of the brakes. As the vehicle proceeds through block section C, the pressure in reservoir 24 constantly becomes lower, hence, the speed at which the vehicle may travel without causing an application of the brakes becomes constantly lower. Obviously, if the driver of the vehicle reduces the speed in accordance with the caution indication given by signal $S^C$, the automatic application of the brakes by valve 16 may be prevented. If an automatic application takes place, then when the speed has been reduced a certain amount, valve 16 again closes, thereby permitting pressure to be built up in the brake pipe 6 to release the brakes.

At some point in block section C, the fluid in reservoir 24 becomes substantially exhausted, and it is evident that if no other means were provided to act in opposition to the centrifugal device 8, the latter would then unseat valve 16 at even the lowest possible speed of the vehicle, hence the vehicle would be brought to a stop and could not be moved. It is desirable, however, that even after the action of the fluid on the diaphragm 22 becomes substantially zero, the vehicle should be permitted to proceed slowly, and for this purpose I provide additional means acting in opposition to the centrifugal device 8. This means, as here shown, is a spring 67, which presses on a head 68, which latter engages the diaphragm 22. The pressure of this spring on head 68 is such that when the pressure of the fluid on diaphragm 22 is substantially zero, the vehicle may proceed at a low speed, such for example, as 15 miles per hour, without the action of the centrifugal device 8 overbalancing the spring 67, hence at and below this speed the brakes will not be applied.

If desired, the volume of reservoir 24 may be such that when it is charged at a ramp rail, the quantity of fluid which it contains is sufficient to permit the vehicle to proceed at full speed to a point located at the maximum braking distance in the rear of the second ramp rail in advance. For example, in Fig. 2, as the vehicle 2 passes over ramp rail $39^B$, the quantity of fluid admitted to reservoir 24 may be such that the vehicle may proceed at full speed to a point located at substantially the maximum braking distance in the rear of signal $S^D$. Ramp rail $39^C$ being deënergized, when the vehicle passes over this rail the supply of fluid in reservoir will not be renewed, hence, when the vehicle reaches the point at maximum braking distance in the rear of signal $S^D$, if the vehicle is still moving at full speed, the brakes will be applied and the vehicle will be brought to a stop just in the rear of signal $S^D$.

It will be seen from the foregoing that I have provided apparatus which will, under conditions of safety, impose a continuous high speed limit, and under conditions of caution will impose a continuous low speed limit, and which, when a danger point is being approached, will cause a gradual decrease of speed limit from the high limit to the low limit in such a manner that if at any time during such decrease the permissive speed is exceeded, the vehicle will be brought to a stop at substantially the same point outside the zone of danger.

Although I have herein shown and described only certain forms of apparatus embodying my invention, it is understood that various changes and modifications may be made therein within the scope of the appended claims without departing from the spirit and scope of my invention.

Having thus described my invention, what I claim is:

1. In combination, a railway track, a vehicle adapted to travel thereon, a source of fluid pressure and a reservoir on the vehicle, means on the vehicle for admitting fluid from said source to the reservoir, devices located at intervals along the trackway for for causing the operation of said means, means on the vehicle for permitting gradual decrease of the fluid pressure in said reservoir as the vehicle proceeds along the track, and vehicle-governing means responsive to the pressure in said reservoir.

2. In combination, a railway track, a vehicle adapted to travel thereon, a source of fluid pressure and a reservoir on the vehicle, means on the vehicle for admitting fluid from said source to the reservoir, devices located at intervals along the trackway for causing the operation of said means, means on the vehicle for permitting gradual decrease of the fluid pressure in said reservoir as the vehicle proceeds along the track, a centrifugal device operatively connected with a wheel of the vehicle and acting in opposition to the fluid pressure in the reservoir, and vehicle-governing means operated when the action of the centrifugal device over-balances the pressure in the reservoir.

3. In combination, a railway track, a vehicle adapted to travel thereon, a source of fluid pressure and a reservoir on the vehicle, means located at intervals along the trackway for causing fluid pressure to be admitted to the reservoir from said source, means on the vehicle for permitting reduction of the pressure in the reservoir as the vehicle proceeds along the track, and vehicle-governing means responsive to the fluid pressure in said reservoir.

4. In combination, a railway track, a vehicle adapted to travel thereon, a source of fluid pressure and a reservoir on the vehicle, a valve on the vehicle adapted to connect the reservoir with or disconnect it from the said source, said valve being biased to the closed position, means for opening said valve, means located at intervals along the trackway for causing operation of said valve-opening means, means operated by a wheel of the vehicle for permitting gradual reduction of the pressure in said reservoir as the vehicle proceeds along the trackway, and vehicle-controlling means responsive to the fluid pressure in the reservoir.

5. In combination, a railway track, a vehicle adapted to travel thereon, a source of fluid pressure and a reservoir on the vehicle, means located at intervals along the trackway for admitting fluid pressure to the reservoir from the said source, means controlled by the vehicle for permitting gradual outflow of said fluid pressure from the reservoir in accordance with the distance traveled by the vehicle, and vehicle-controlling means responsive to the fluid pressure in said reservoir.

6. In combination, a railway track, a vehicle adapted to travel thereon, a source of fluid pressure and a reservoir on the vehicle, the pressure of the source being substantially constant, devices located at intervals along the trackway for causing fluid pressure to be admitted to the reservoir from the source, means on the vehicle for permitting reduction of the pressure in the reservoir in accordance with the distance traveled by the vehicle, a centrifugal device driven by the vehicle and acting in opposition to the pressure in the reservoir, and vehicle-governing means operated by the centrifugal device when the latter overcomes the pressure in the reservoir, the volume of the reservoir being such that the vehicle may proceed at full speed from one trackway device to the next without the centrifugal device overcoming the pressure in the reservoir.

7. In combination, a railway track, a vehicle adapted to travel thereon, a source of fluid pressure and a reservoir on the vehicle, the pressure of the source being substantially constant, devices located at intervals along the trackway for causing fluid pressure to be admitted to the reservoir from the source, means on the vehicle for permitting reduction of the pressure in the reservoir in accordance with the distance traveled by the vehicle, a centrifugal device driven by the vehicle and acting in opposition to the pressure in the reservoir, and vehicle-governing means operated by the centrifugal device when the latter overcomes the pressure in the reservoir, the volume of the reservoir being such that the vehicle may proceed at full speed from one trackway device to a point at susbtantially the maximum braking distance in the rear of the second trackway device in advance without the centrifugal device overcoming the pressure in the reservoir.

8. In combination, a railway track, a vehicle adapted to travel thereon, a source of fluid pressure and a reservoir on the vehicle, the pressure of the source being substantially constant, devices located at intervals along the trackway for causing fluid pressure to be admitted to the reservoir from the source, means on the vehicle for permitting reduction of the pressure in the reservoir in accordance with the distance traveled by the vehicle, and vehicle-governing means controlled by the fluid pressure in the reservoir, the volume of the reservoir being such that the vehicle may proceed from one trackway device to the next without operation of the vehicle-governing means.

9. In combination, a railway track, a vehicle adapted to travel thereon, a source of fluid pressure and a reservoir on the vehicle, the pressure of the source being substantially constant, devices located at intervals along the trackway for causing fluid pressure to be admitted to the reservoir from the source, means on the vehicle for permitting reduction of the pressure in the reservoir in accordance with the distance traveled by the vehicle, and vehicle-governing means controlled by the fluid pressure in the reservoir, the volume of the reservoir being such that the vehicle may proceed from one trackway device to a point at substantially the maximum braking distance in the rear of the second trackway device in advance without operation of the vehicle-governing means.

10. Speed controlling apparatus for railway vehicles, comprising a speed-responsive device on the vehicle, fluid pressure acting in opposition to said speed-responsive device, means for causing gradual variation of the pressure of said fluid in accordance with the progress of the vehicle along the trackway, and means controlled by the speed-responsive device for governing the vehicle.

11. Controlling apparatus for vehicles comprising a centrifugal device operated by a wheel of the vehicle, fluid pressure tending to hold the centrifugal device closed, and means operated by the centrifugal device when the latter opens for controlling the vehicle.

12. Speed controlling apparatus for vehicles comprising a centrifugal device operated by a wheel of the vehicle, fluid pressure tending to hold the centrifugal device closed, means on the vehicle for permitting a gradual reduction of the pressure of said fluid on the centrifugal device, means for renewing said fluid pressure, and means operated by the centrifugal device for controlling the vehicle when the centrifugal device opens.

13. Speed controlling apparatus for vehicles comprising a diaphragm on the vehicle, fluid pressure acting upon one side of said diaphragm, a centrifugal device driven by a wheel of the vehicle and acting upon the other side of said diaphragm, and vehicle-controlling means responsive to over-balancing of the pressure of the fluid on the diaphragm by the pressure of the centrifugal device.

14. Speed controlling apparatus for vehicles comprising a diaphragm on the vehicle, fluid pressure acting upon one side of said diaphragm, a centrifugal device driven by a wheel of the vehicle and acting upon the other side of said diaphragm, and a valve controlled by the centrifugal device which valve is in one position or another according as the pressure exerted by the centrifugal device or by the fluid on said diaphragm is in predominance, and means controlled by said valve for governing the vehicle.

15. Speed controlling apparatus for railway vehicles comprising a centrifugal device on the vehicle, a member moved longitudinally by the weights of said device, fluid pressure on the vehicle acting in opposition to the movement of said member corresponding to the outward movement of the weights, and means affected by the outward movement of the weights for controlling the vehicle.

16. Speed controlling apparatus for railway vehicles, comprising a speed-responsive device on the vehicle, a fluid pressure receptacle on the vehicle, means for causing gradual variation of the pressure of the fluid in said receptacle in accordance with the progress of the vehicle along the track, and vehicle-governing means controlled by said speed-responsive device and by the fluid pressure in said receptacle.

17. In combination, a railway vehicle, a fluid pressure receptacle thereon, means for causing gradual variation of the pressure in said receptacle in accordance with the progress of the vehicle along the track, and vehicle-governing means controlled by the pressure in said receptacle.

18. In combination, a railway vehicle, a fluid pressure receptacle thereon, means on the vehicle for causing gradual variation of the pressure in said receptacle in accordance with the progress of the vehicle along the track, means located in the trackway for causing the pressure in said receptacle to be restored to its initial value, the first-mentioned means being arranged to automatically cause resumption of the variation of pressure after such restoration, and vehicle-governing means controlled by the pressure in said receptacle.

19. In combination, a railway vehicle, a fluid pressure receptacle thereon, means for causing gradual variation of the pressure in said receptacle from one value to another within a limited interval of vehicle travel, and vehicle-governing means controlled by the pressure in said receptacle.

20. Speed controlling apparatus for vehicles comprising a movable member on the vehicle, means for exerting a force on said member in one direction varying in accordance with the speed of the vehicle, means for exerting an opposing force on said member varying in accordance with the distance traveled by the vehicle from a given point, and traffic controlling means on the vehicle controlled by said movable member.

21. The combination with an air brake system, of automatically controlled means for applying the same by release of air, a discharge valve movable synchronously with the train and means whereby equal volume of air is released at each operation of the synchronous valve.

22. The combination in a braking system with a train pipe, of a valve for opening the train pipe, an air cylinder and piston for controlling said valve, and means moving synchronously with the train for controlling the rate of discharge of said cylinder to open said valve.

23. The combination in a braking system with a train pipe and a valve driven by the train to intermittently discharge air to open the train pipe, of means causing said valve to discharge a measured quantity of air at each operation independently of the train speed.

24. The combination in a braking system with a train pipe, of a measuring valve driven by the train to intermittently discharge measured quantities of air.

25. The combination in a braking system with a train pipe, of a measuring valve driven by the train to intermittently discharge measured quantities of air, said valve comprising an inlet and a discharge port and a measuring element preventing direct connection between said ports.

In testimony whereof I affix my signature in presence of two witnesses.

FRANK H. NICHOLSON.

Witnesses:
  H. DE MOYA,
  LAURA E. SMITH.